(12) United States Patent
Kubota et al.

(10) Patent No.: US 10,219,259 B2
(45) Date of Patent: Feb. 26, 2019

(54) UPLINK-BASED CELL SELECTION

(71) Applicant: QUALCOMM Incorporated, San Diego, CA (US)

(72) Inventors: Keiichi Kubota, San Diego, CA (US); Gavin Bernard Horn, La Jolla, CA (US); Joseph Binamira Soriaga, San Diego, CA (US); Tingfang Ji, San Diego, CA (US); Tao Luo, San Diego, CA (US); Hung Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 15/590,228

(22) Filed: May 9, 2017

(65) Prior Publication Data

US 2017/0332371 A1 Nov. 16, 2017

Related U.S. Application Data

(60) Provisional application No. 62/336,561, filed on May 13, 2016.

(51) Int. Cl.
*H04W 72/04* (2009.01)
*H04W 48/20* (2009.01)
(Continued)

(52) U.S. Cl.
CPC ...... *H04W 72/0413* (2013.01); *H04B 7/0621* (2013.01); *H04B 7/0632* (2013.01);
(Continued)

(58) Field of Classification Search
CPC ... H04B 7/0621; H04B 7/0632; H04L 5/0035; H04L 5/0057; H04L 5/0058;
(Continued)

(56) References Cited

U.S. PATENT DOCUMENTS

| 6,438,378 | B1 * | 8/2002 | Kouno | H04W 36/30 |
| | | | | 370/333 |
| 7,164,911 | B2 * | 1/2007 | Watanabe | H04W 60/00 |
| | | | | 455/435.1 |

(Continued)

FOREIGN PATENT DOCUMENTS

| CN | 101641986 A | * 2/2010 | ............ H04W 36/30 |
| CN | 101641986 B | * 9/2013 | ............ H04W 36/30 |

(Continued)

OTHER PUBLICATIONS

Dimou K.D., et al., "On the Use of Uplink Received Signal Strength Measurements for Handover", Vehicular Technology Conference, VTC Spring, May 11, 2008, XP031256028, ISBN: 978-1-4244-1644-8, pp. 2567-2571.

(Continued)

*Primary Examiner* — Eric Nowlin
(74) *Attorney, Agent, or Firm* — Patterson & Sheridan, L.L.P

(57) ABSTRACT

Aspects of the present disclosure provide apparatus and techniques that may be applied in systems for improving reliability of cell selection to ensure that a UE is capable of transmitting on the uplink in addition to receiving on the downlink upon mobility An exemplary method, performed by a user equipment (UE), generally includes receiving reference signals from one or more transmission reception points (TRPs) in a wireless communications network, pre-selecting, based on the received reference signals, a first TRP, of the one or more TRPs, from which to receive wireless service, transmitting an uplink (UL) signal to the first TRP, receiving, from the first TRP, feedback comprising information about the UL signal, and determining, based at least in part on the feedback, to select the first TRP from which to receive the wireless service.

24 Claims, 12 Drawing Sheets

DL based HO
UE reports DL measurements Network decides

UL based HO
TRPs measure UL signals Network decides

DL based selection
UE measures DL signals UE decides

UL based selection
TRPs responds to UL signals UE decides

(51) Int. Cl.
*H04B 7/06* (2006.01)
*H04L 5/00* (2006.01)
*H04W 36/00* (2009.01)
*H04W 48/12* (2009.01)

(52) U.S. Cl.
CPC .......... *H04L 5/0035* (2013.01); *H04L 5/0058* (2013.01); *H04L 5/0073* (2013.01); *H04L 5/0094* (2013.01); *H04W 36/0094* (2013.01); *H04W 36/0085* (2018.08); *H04W 48/12* (2013.01); *H04W 48/20* (2013.01)

(58) Field of Classification Search
CPC .............. H04L 5/0073; H04L 5/0094; H04W 36/0083; H04W 36/0094; H04W 36/08; H04W 36/30; H04W 48/12; H04W 48/20; H04W 72/0413
See application file for complete search history.

(56) References Cited

U.S. PATENT DOCUMENTS

| | | | | |
|---|---|---|---|---|
| 7,266,381 B2* | 9/2007 | Charles | H04W 48/04 | 455/450 |
| 7,515,559 B2* | 4/2009 | Koo | H04W 36/0055 | 370/328 |
| 8,140,081 B2* | 3/2012 | Barrett | H04W 36/0083 | 455/444 |
| 8,145,271 B2* | 3/2012 | Ishii | H04W 72/0406 | 370/336 |
| 8,165,587 B2* | 4/2012 | Dahlen | H04W 48/02 | 370/331 |
| 8,340,664 B2* | 12/2012 | Tenny | H04W 48/20 | 455/432.1 |
| 8,526,374 B2* | 9/2013 | Damnjanovic | H04L 5/0053 | 370/329 |
| 8,744,439 B2* | 6/2014 | Deivasigamani | H04W 48/20 | 455/434 |
| 8,891,489 B2* | 11/2014 | Attar | H04W 36/245 | 370/332 |
| 8,908,612 B2* | 12/2014 | Wigard | H04W 74/0866 | 370/329 |
| 8,942,702 B2* | 1/2015 | Chin | H04W 36/14 | 370/328 |
| 8,965,426 B2* | 2/2015 | Sambhwani | H04W 28/04 | 455/501 |
| 9,148,831 B2* | 9/2015 | Cheng | H04W 36/0083 | |
| 9,225,449 B2* | 12/2015 | Heo | H04W 4/90 | |
| 9,241,289 B1* | 1/2016 | Oroskar | H04W 48/16 | |
| 9,332,475 B2* | 5/2016 | Attar | H04W 36/245 | |
| 9,455,820 B2* | 9/2016 | Sharma | H04L 5/14 | |
| 9,578,583 B2* | 2/2017 | Lai | H04W 36/32 | |
| 9,635,595 B2* | 4/2017 | Chen | H04W 36/30 | |
| 9,729,307 B1* | 8/2017 | Patel | H04L 5/1469 | |
| 9,900,136 B2* | 2/2018 | Parkvall | H04L 5/0023 | |
| 9,913,179 B2* | 3/2018 | Kompalli Chakravartula | H04W 36/0083 | |
| 10,009,905 B2* | 6/2018 | Kakishima | H04B 7/0413 | |
| 2002/0138195 A1* | 9/2002 | Watanabe | H04W 60/00 | 455/435.1 |
| 2004/0058684 A1* | 3/2004 | Charles | H04W 48/04 | 455/450 |
| 2005/0277419 A1* | 12/2005 | Takano | H04W 52/40 | 455/442 |
| 2006/0286982 A1* | 12/2006 | Prakash | H04W 60/04 | 455/435.1 |
| 2007/0086388 A1* | 4/2007 | Kang | H04W 36/30 | 370/331 |
| 2009/0028112 A1* | 1/2009 | Attar | H04W 36/245 | 370/332 |
| 2009/0047954 A1* | 2/2009 | Tenny | H04W 48/20 | 455/435.3 |
| 2009/0268676 A1* | 10/2009 | Wigard | H04W 74/0866 | 370/329 |
| 2010/0029283 A1* | 2/2010 | Iwamura | H04J 11/0069 | 455/437 |
| 2010/0067470 A1* | 3/2010 | Damnjanovic | H04L 5/0053 | 370/329 |
| 2010/0093351 A1* | 4/2010 | Barrett | H04W 36/0083 | 455/436 |
| 2010/0105390 A1* | 4/2010 | Ishii | H04W 72/0406 | 455/436 |
| 2010/0124924 A1* | 5/2010 | Cheng | H04W 36/0083 | 455/434 |
| 2010/0238884 A1* | 9/2010 | Borran | H04W 16/10 | 370/329 |
| 2010/0323662 A1* | 12/2010 | Dahlen | H04W 48/02 | 455/410 |
| 2010/0329216 A1* | 12/2010 | Jen | H04B 7/2606 | 370/332 |
| 2011/0014922 A1* | 1/2011 | Jen | H04W 74/002 | 455/450 |
| 2011/0103250 A1* | 5/2011 | Li | H04W 76/27 | 370/252 |
| 2011/0105119 A1* | 5/2011 | Bienas | H04W 36/0055 | 455/436 |
| 2012/0207070 A1* | 8/2012 | Xu | H04W 52/0225 | 370/311 |
| 2013/0090115 A1* | 4/2013 | Deivasigamani | H04W 48/20 | 455/434 |
| 2013/0223235 A1* | 8/2013 | Hu | H04W 36/04 | 370/242 |
| 2013/0258875 A1* | 10/2013 | Siomina | H04W 36/30 | 370/252 |
| 2014/0057635 A1* | 2/2014 | Sergeyev | H04W 48/20 | 455/440 |
| 2014/0066066 A1* | 3/2014 | Boudreau | H04W 36/0083 | 455/436 |
| 2014/0106749 A1* | 4/2014 | Wegmann | H04W 48/18 | 455/436 |
| 2014/0146696 A1* | 5/2014 | Lin | H04W 72/12 | 370/252 |
| 2014/0148163 A1* | 5/2014 | Chin | H04W 36/14 | 455/436 |
| 2014/0248878 A1* | 9/2014 | Wong | H04W 36/0061 | 455/436 |
| 2014/0349647 A1* | 11/2014 | Chen | H04W 36/30 | 455/436 |
| 2015/0043416 A1* | 2/2015 | Parkvall | H04L 5/0023 | 370/312 |
| 2015/0045040 A1* | 2/2015 | Lai | H04W 36/32 | 455/441 |
| 2015/0055630 A1* | 2/2015 | Attar | H04W 36/245 | 370/332 |
| 2015/0109918 A1* | 4/2015 | Sharma | H04L 5/14 | 370/230 |
| 2015/0334611 A1* | 11/2015 | Kim | H04W 36/0083 | 370/331 |
| 2016/0219475 A1* | 7/2016 | Kim | H04L 5/00 | |
| 2016/0308635 A1* | 10/2016 | Zhou | H04W 52/04 | |
| 2017/0006613 A1* | 1/2017 | Kakishima | H04B 7/0413 | |
| 2017/0034758 A1* | 2/2017 | Lai | H04W 36/32 | |
| 2017/0055282 A1* | 2/2017 | Sadiq | H04W 74/004 | |
| 2017/0289864 A1* | 10/2017 | Narasimha | H04W 36/0027 | |
| 2017/0332371 A1* | 11/2017 | Kubota | H04B 7/0621 | |
| 2017/0366294 A1* | 12/2017 | Breuer | H04K 3/222 | |
| 2017/0374588 A1* | 12/2017 | Guo | H04W 24/00 | |
| 2018/0131480 A1* | 5/2018 | Parkvall | H04L 5/0023 | |
| 2018/0132158 A1* | 5/2018 | Tseng | H04W 76/27 | |

FOREIGN PATENT DOCUMENTS

| | | | | |
|---|---|---|---|---|
| EP | 2140707 A2 * | 1/2010 | ............ | H04W 36/30 |
| EP | 2140707 B1 * | 8/2017 | ............ | H04W 36/30 |
| EP | 3255926 A1 * | 12/2017 | ............ | H04W 36/30 |
| ES | 2644493 T3 * | 11/2017 | ............ | H04W 36/30 |
| GB | 2506888 A | 4/2014 | | |
| JP | 5453240 B2 * | 3/2014 | ............ | H04W 36/30 |
| KR | 20090130386 A * | 12/2009 | ............ | H04W 36/30 |
| KR | 101205932 B1 * | 11/2012 | ............ | H04W 36/30 |

(56) References Cited

FOREIGN PATENT DOCUMENTS

| WO | WO-2008116027 A2 * | 9/2008 | ............ H04W 36/30 |
| WO | WO-2008116027 A3 * | 12/2008 | ............ H04W 36/30 |
| WO | WO-2016003336 A1 | 1/2016 | |

OTHER PUBLICATIONS

International Search Report and Written Opinion—PCT/US2017/031900—ISA/EPO—Aug. 18, 2017.
Research in Motion et al., "Downlink CSI Feedback for Low-Power Nodes", 3GPP TSG RAN WG1 #65, R1-111662, May 9, 2011, 6 pages.

* cited by examiner

UPLINK-BASED CELL SELECTION

CLAIM OF PRIORITY UNDER 35 U.S.C. § 119

This application claims benefit of U.S. Provisional Patent Application Ser. No. 62/336,561, filed May 13, 2016, which is herein incorporated by reference in its entirety.

FIELD OF THE DISCLOSURE

Certain aspects of the present disclosure generally relate to wireless communications and, more particularly, to uplink-based cell selection.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects of the present disclosure provide a method for wireless communications by a UE. The method generally includes receiving reference signals from one or more transmission reception points (TRPs) in a wireless communications network, pre-selecting, based on the received reference signals, a first TRP, of the one or more TRPs, from which to receive wireless service, transmitting an uplink (UL) signal to the first TRP, receiving, from the first TRP, feedback comprising information about the UL signal, and determining, based at least in part on the feedback, to select the first TRP from which to receive the wireless service.

Certain aspects of the present disclosure provide an apparatus for wireless communications by a UE. The apparatus generally includes at least one processor configured to: receive reference signals from one or more transmission reception points (TRPs) in a wireless communications network, pre-select, based on the received reference signals, a first TRP, of the one or more TRPs, from which to receive wireless service, transmit an uplink (UL) signal to the first TRP, receive, from the first TRP, feedback comprising information about the UL signal, and determine, based at least in part on the feedback, to select the first TRP from which to receive the wireless service. The apparatus also includes a memory coupled with the at least one processor.

Certain aspects of the present disclosure provide an apparatus for wireless communications by a UE. The apparatus generally includes means for receiving reference signals from one or more transmission reception points (TRPs) in a wireless communications network, means for pre-selecting, based on the received reference signals, a first TRP, of the one or more TRPs, from which to receive wireless service, means for transmitting an uplink (UL) signal to the first TRP, receiving, from the first TRP, feedback comprising information about the UL signal, and means for determining, based at least in part on the feedback, to select the first TRP from which to receive the wireless service.

Certain aspects of the present disclosure provide a non-transitory computer-readable medium for wireless communications by a UE. The non-transitory computer-readable medium generally includes instructions for receiving reference signals from one or more transmission reception points (TRPs) in a wireless communications network, pre-selecting, based on the received reference signals, a first TRP, of the one or more TRPs, from which to receive wireless service, transmitting an uplink (UL) signal to the first TRP, receiving, from the first TRP, feedback comprising information about the UL signal, and determining, based at least in part on the feedback, to select the first TRP from which to receive the wireless service.

Certain aspects of the present disclosure provide a method for wireless communications by a base station (BS). The method generally includes transmitting reference signals to one or more user equipments (UEs), receiving an uplink (UL) signal from a first UE of the one or more UEs, transmitting, to the first UE, feedback comprising information about the UL signal, and providing wireless service to the first UE based, at least in part, on the feedback information.

Certain aspects of the present disclosure provide an apparatus for wireless communications by a base station (BS). The apparatus generally includes at least one processor configured to transmit reference signals to one or more user equipments (UEs), receive an uplink (UL) signal from a first UE of the one or more UEs, and transmit, to the first UE, feedback comprising information about the UL signal. The apparatus also includes a memory coupled with the at least one processor.

Certain aspects of the present disclosure provide an apparatus for wireless communications by a base station (BS). The apparatus generally includes means for transmitting reference signals to one or more user equipments (UEs), means for receiving an uplink (UL) signal from a first UE of the one or more UEs, and means for transmitting, to the first UE, feedback comprising information about the UL signal.

Certain aspects of the present disclosure provide a non-transitory computer-readable medium for wireless communications by a base station (BS). The non-transitory computer-readable medium generally includes instructions for transmitting reference signals to one or more user equipments (UEs), receiving an uplink (UL) signal from a first UE of the one or more UEs, and transmitting, to the first UE, feedback comprising information about the UL signal.

Numerous other aspects are provided including methods, apparatus, systems, computer program products, and processing systems.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
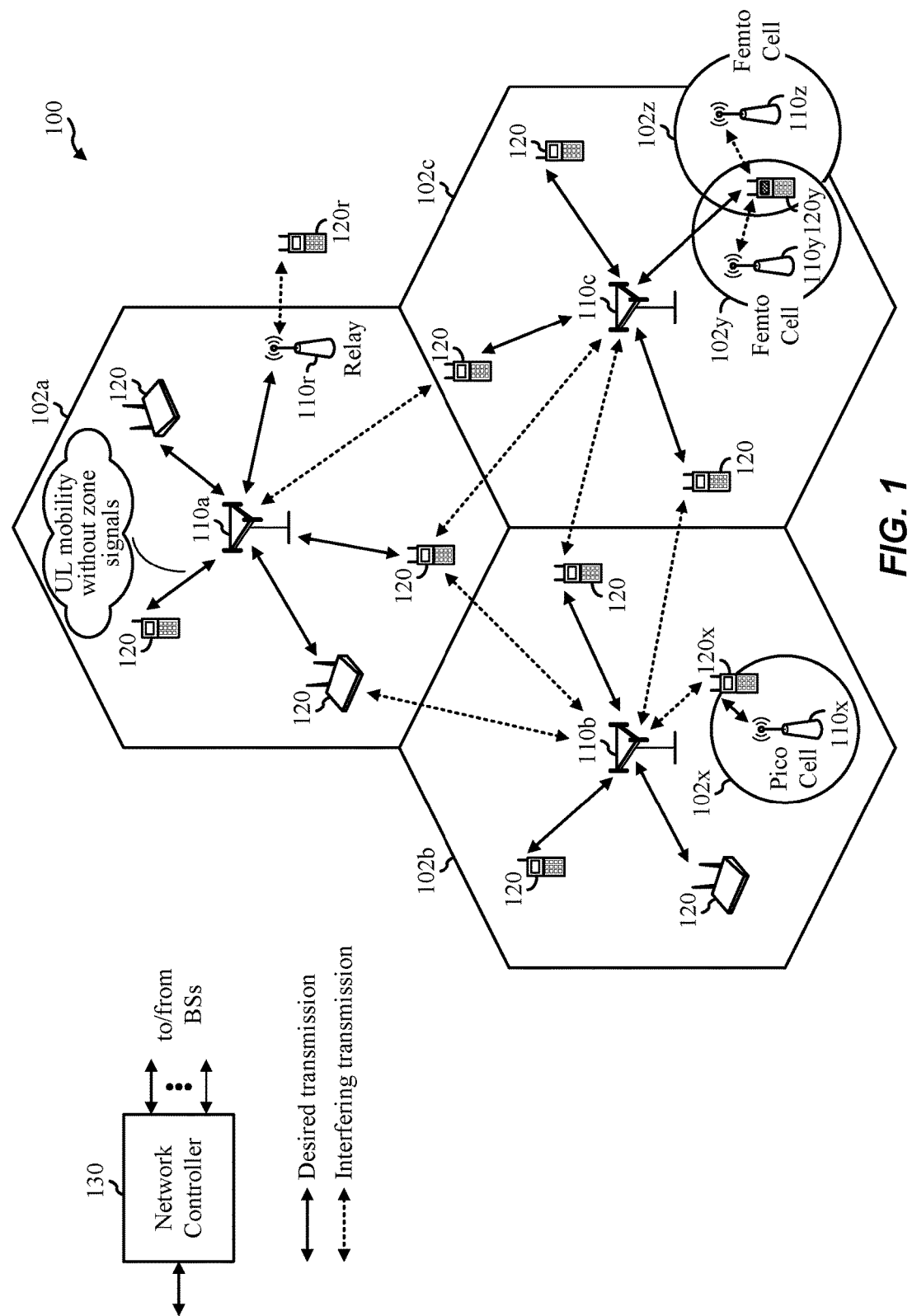
FIG. 1 is a block diagram conceptually illustrating an example telecommunications system, in accordance with certain aspects of the present disclosure.

Aspects of the present disclosure provide apparatus, methods, processing systems, and computer readable mediums for multi-slice networks, such as new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

In 5G, different use cases may require URLLC (e.g., in some cases for industry automation deployment). For URLLC, a UE may need to ensure it can establish a radio link of sufficient uplink and downlink quality towards a target cell prior to a serving cell change (e.g., prior to mobility of the UE). However, existing mobility procedures used in legacy mobile communication systems, such as LTE, take into account only downlink channel quality but not uplink channel quality.

Thus, aspects of the present disclosure provide techniques that may help improve reliability of cell selection, for example, to ensure that a UE is capable of transmitting on the uplink in addition to receiving on the downlink upon mobility of the UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies, such as a 5G nextgen/NR network.

Example Wireless Communications System

FIG. 1 illustrates an example wireless network 100, such as a new radio (NR) or 5G network, in which aspects of the present disclosure may be performed. For example, techniques presented herein may be used to improve reliability of cell/TRP selection to ensure that a UE is capable of transmitting on the uplink in addition to receiving on the downlink upon mobility of the UE.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed, employing a multi-slice network architecture.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or one or more DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and one or more DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
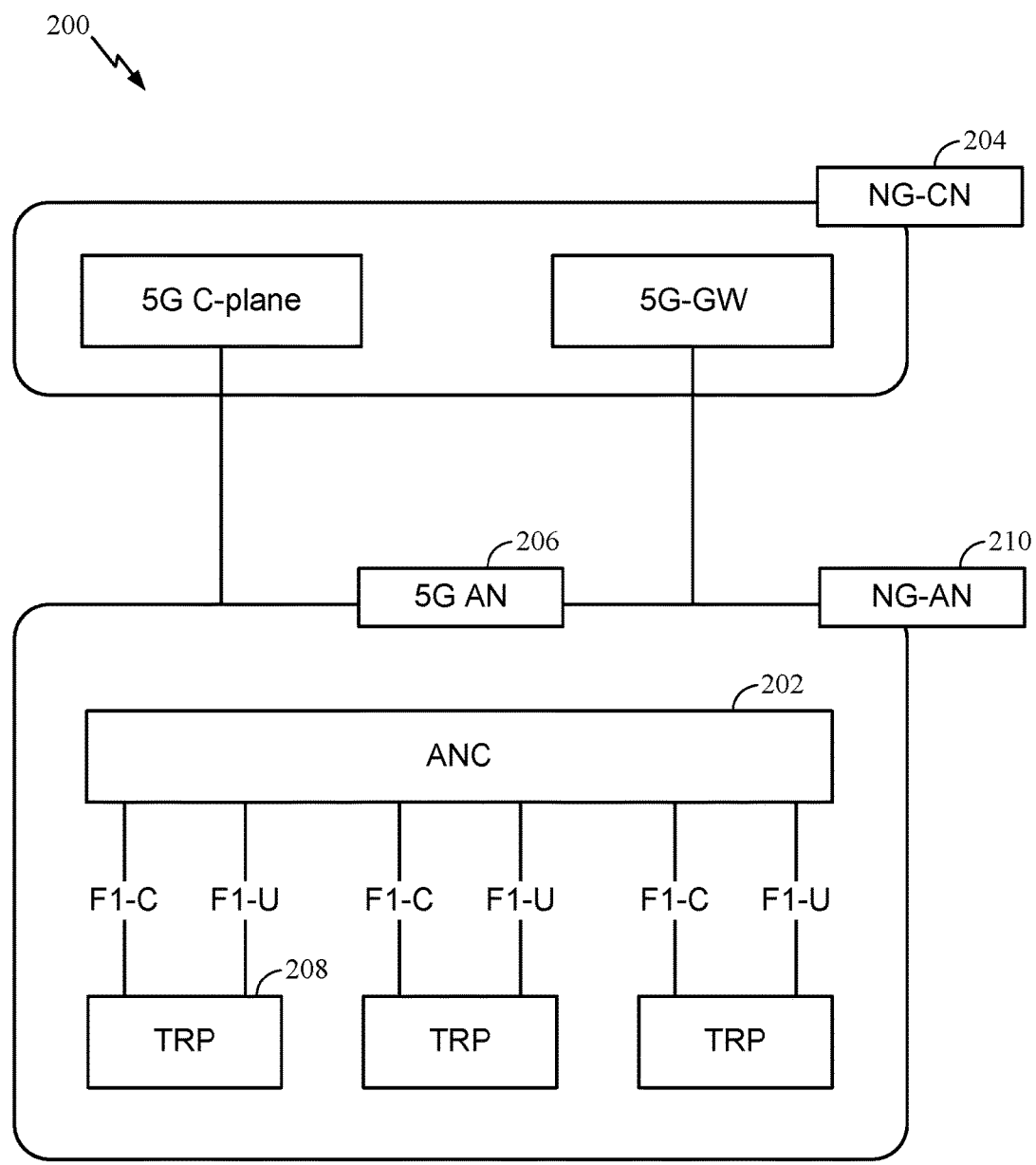
FIG. 2 is a block diagram illustrating an example logical architecture of a distributed RAN, in accordance with certain aspects of the present disclosure.

FIG. 2 illustrates an example logical architecture 200 of a distributed radio access network (RAN), which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNB, or some other term). As described above, a TRP may be used interchangeably with "cell" and may refer to a region where a same set of radio resources are available throughout the region.

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
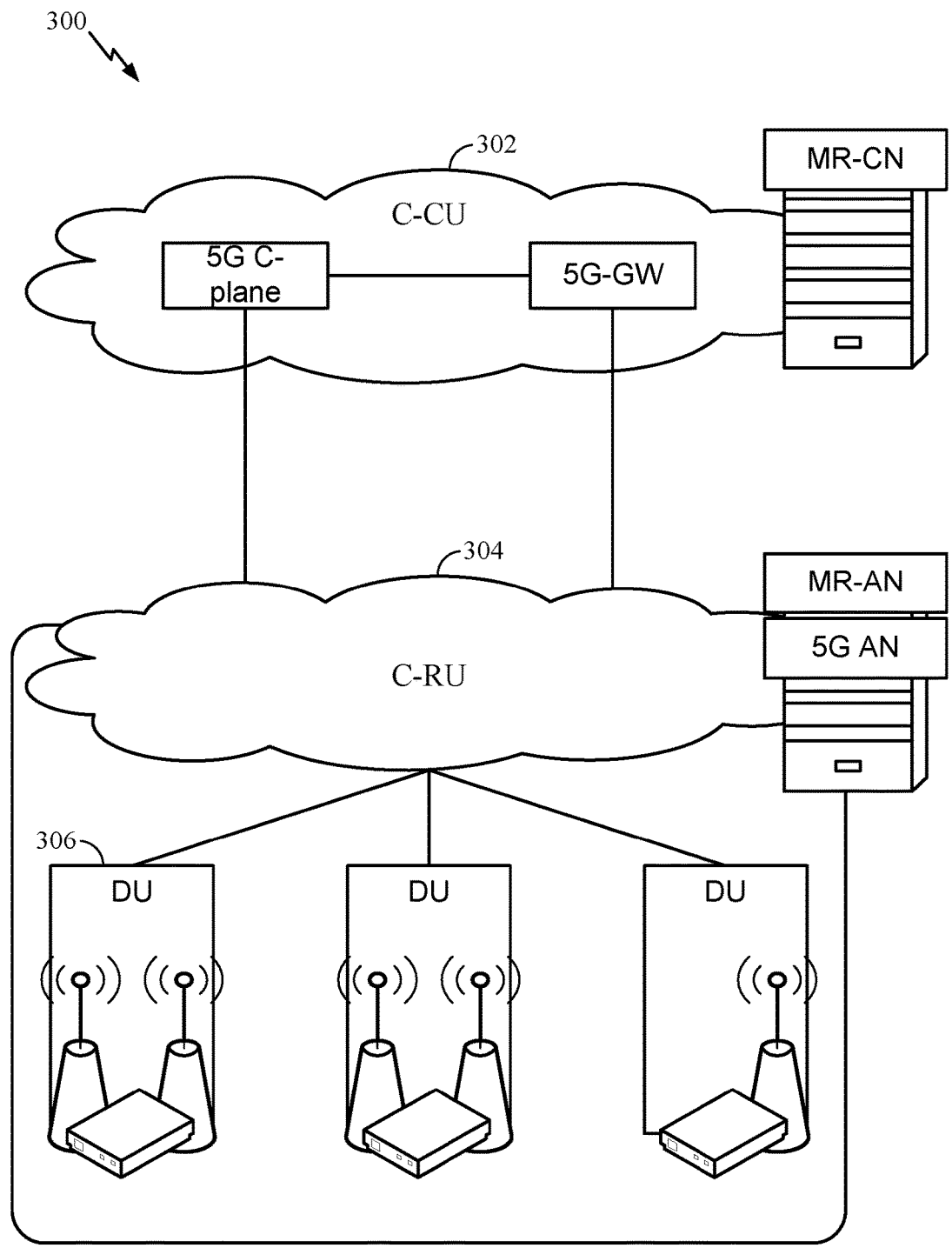
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
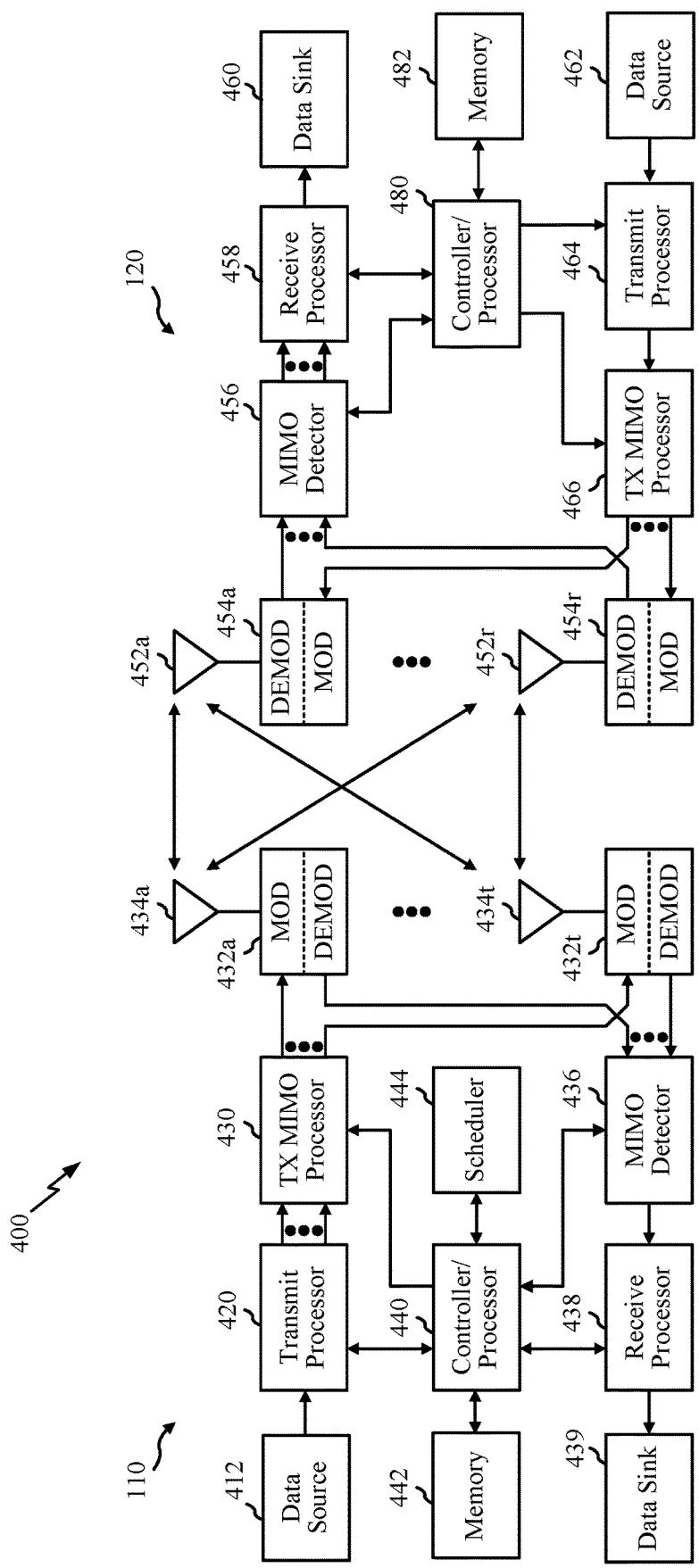
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 9-10.

According to aspects, for a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 12, and/or other processes for the techniques described herein. The processor 480 and/or other processors and modules at the UE 120 may also perform or direct, e.g., the execution of the functional blocks illustrated in FIGS. 8 and/or 11, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
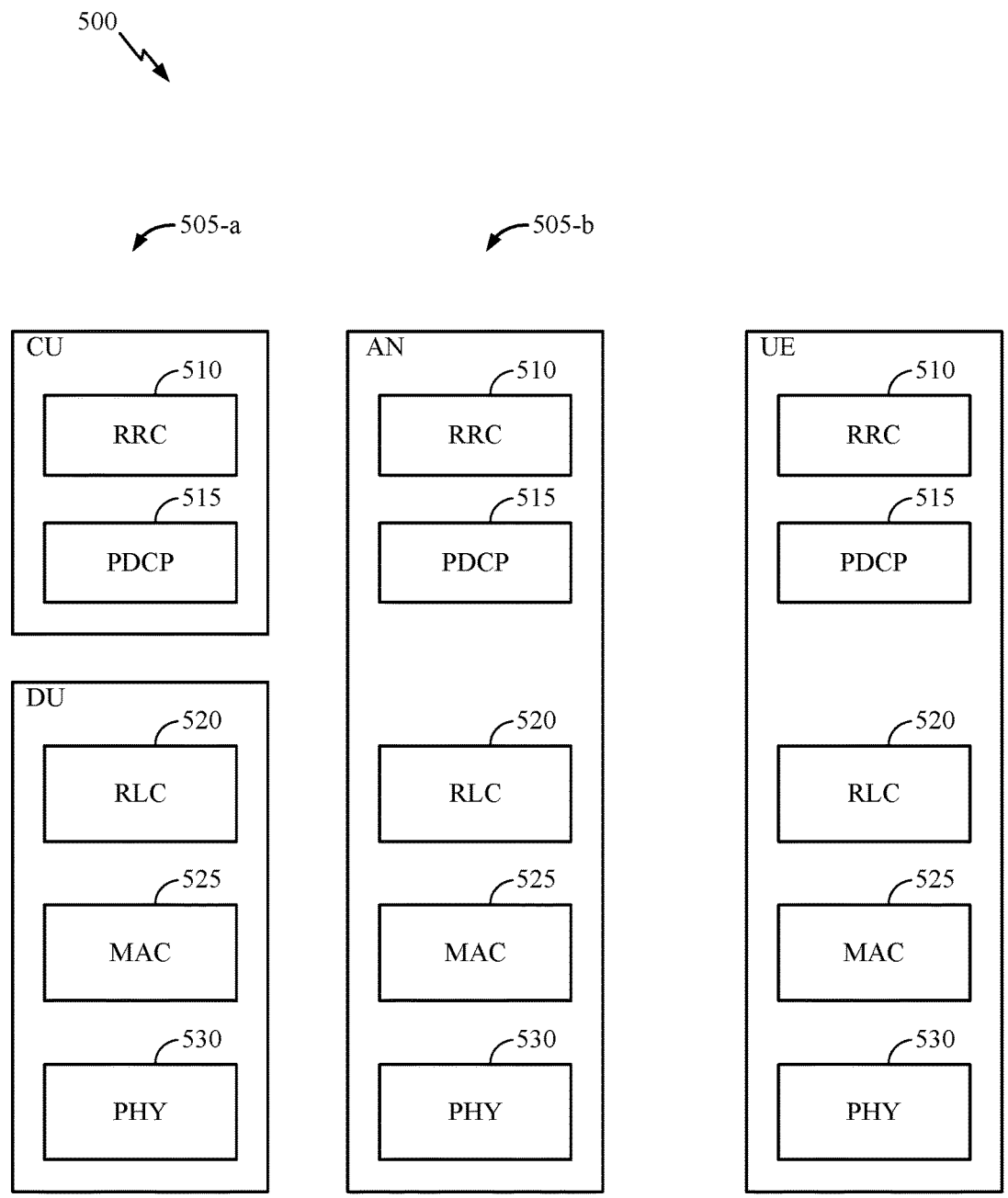
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or one or more DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
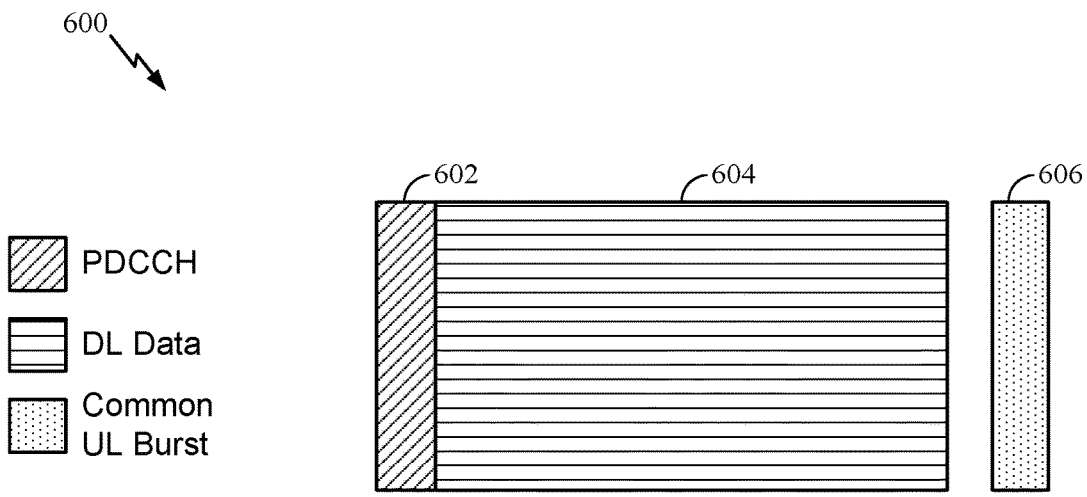
FIG. 6 illustrates an example of a DL-centric subframe, in accordance with certain aspects of the present disclosure.

FIG. 6 is a diagram 600 showing an example of a DL-centric subframe, which may be used to communicate in the wireless network 100. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
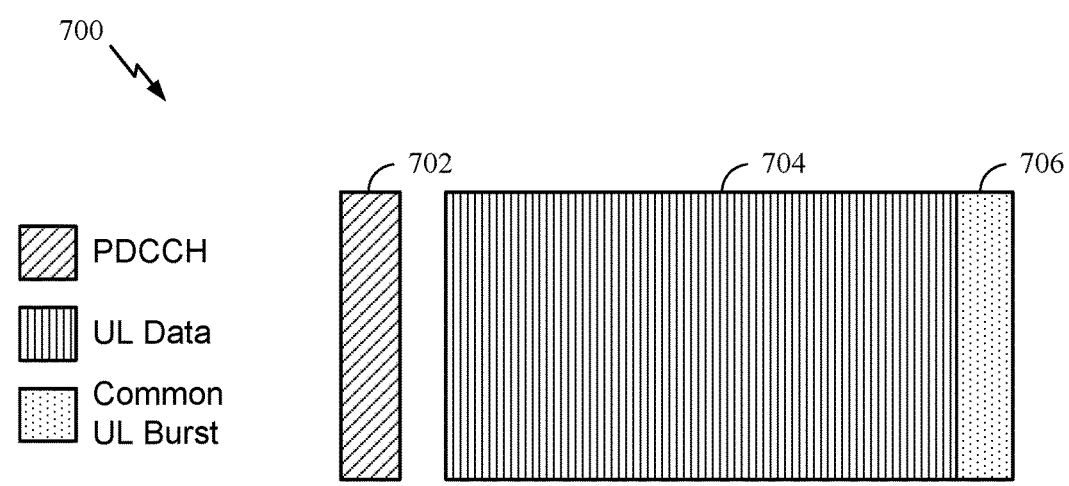
FIG. 7 illustrates an example of an UL-centric subframe, in accordance with certain aspects of the present disclosure.

FIG. 7 is a diagram 700 showing an example of an UL-centric subframe, which may be used to communicate in the wireless network 100. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Uplink-Based Cell Selection

As noted above, a new air interface is being introduced for 5G, including features that include Enhanced mobile broadband (eMBB) targeting wide bandwidth (e.g., 80 MHz beyond), millimeter wave (mmW) targeting high carrier frequency (e.g., 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and Polar codes.

Figure 8:
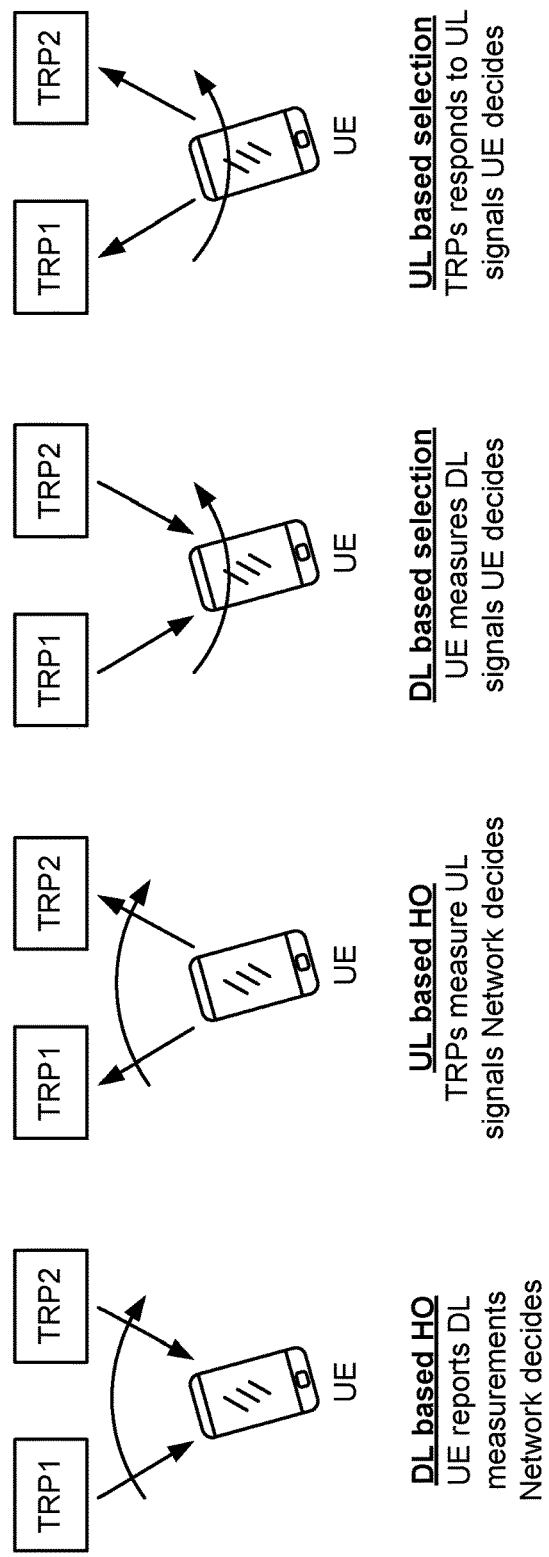
FIG. 8 illustrates different mobility scenarios, in accordance with certain aspects of the present disclosure.

FIG. 8 illustrates different mobility scenarios, in accordance with aspects of the present disclosure. For example, in 5G systems, mobility while in connected mode may encompass four mobility scenarios. These scenarios may be based in part on whether a user equipment (UE) or the radio access network (RAN) determines that the UE should switch from one transmission and reception point (TRP) to another TRP. A reselection occurs when the UE makes the determination to switch to another TRP and a handover occurs where the RAN makes the determination to switch the UE to another TRP. For example, as illustrated in FIG. 8, the four mobility scenarios may include a downlink (DL)-based handover (HO) where the UE reports DL measurements to the network and the network decides whether the UE should be handed over to another TRP, an uplink (UL)-based handover where the TRP measures UL signals from the UE and decides whether the UE should be handed over to another TRP, a DL-based reselection where the UE measures DL signals from the TRP and determines whether reselection is necessary, and an UL-based reselection where the TRP responds to UL signals from the UE and the UE determines whether reselection is necessary. Aspects of the present disclosure focus on UL based selection mobility scenario illustrated in FIG. 8.

In 5G, different use cases may require URLLC (e.g., for industry automation deployment). For URLLC, a UE may need to ensure it can establish a radio link of sufficient uplink and downlink quality towards the target cell (e.g., a target TRP) prior to a serving cell (e.g., a serving TRP) change. However, existing mobility procedures used in legacy mobile communication systems, such as LTE, take into account only downlink channel quality but not uplink channel quality, even when channel reciprocity cannot be exploited in the system (e.g., FDD deployment).

Therefore, techniques are needed to improve reliability of cell selection/reselection to ensure that a UE is capable of transmitting on the uplink in addition to receiving on the downlink upon mobility.

Figure 9:
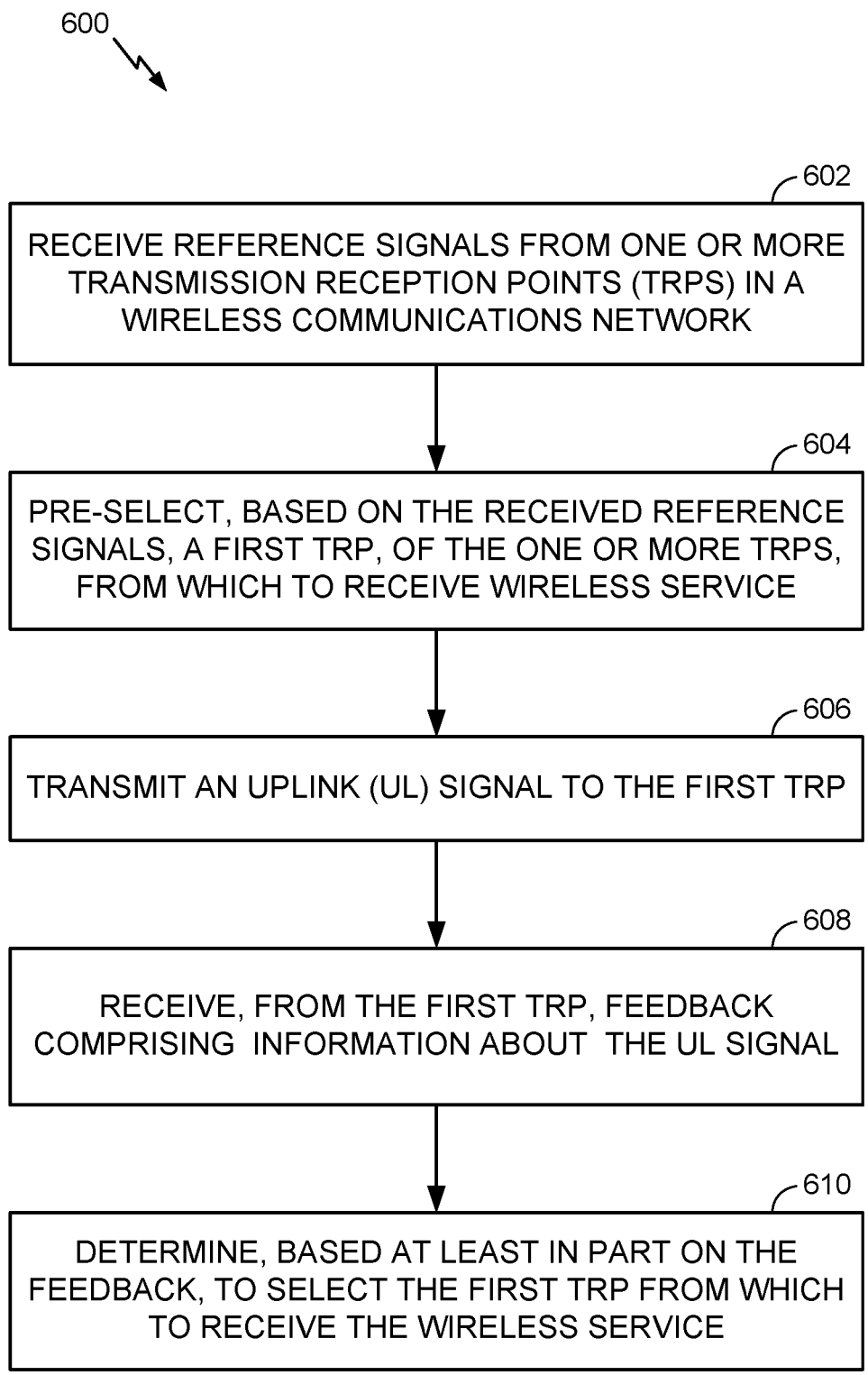
FIG. 9 is a flow diagram illustrating example operations for wireless communications by a user equipment (UE), in accordance with certain aspects of the present disclosure.

FIG. 9 illustrates example operations 900 for wireless communications. According to certain aspects, operations 900 may be performed by a user equipment (e.g., UE 120) for example to assist in selecting a TRP from which to receive wireless service. According to certain aspects, operations 900 may improve reliability of cell selection/reselection to ensure that the UE is capable of transmitting on the uplink.

According to aspects, the UE may include one or more components as illustrated in FIG. 4 which may be configured to perform the operations described herein. For example, the antenna 452, demodulator/modulator 454, controller/processor 480, and/or memory 482 as illustrated in FIG. 4 may perform the operations described herein.

Operations 900 begin at 902 by receiving reference signals from one or more TRPs in a wireless communications network. At 904, the UE pre-selects, based on the received reference signals, a first TRP, of the one or more TRPs, from which to receive wireless service. At 906, the UE transmits an uplink (UL) signal to the first TRP. At 908, the UE receives, from the first TRP, feedback comprising information about the UL signal. At 910, the UE determines, based at least in part on the feedback, to select the first TRP from which to receive the wireless service based, at least in part, on the feedback.

Figure 10:
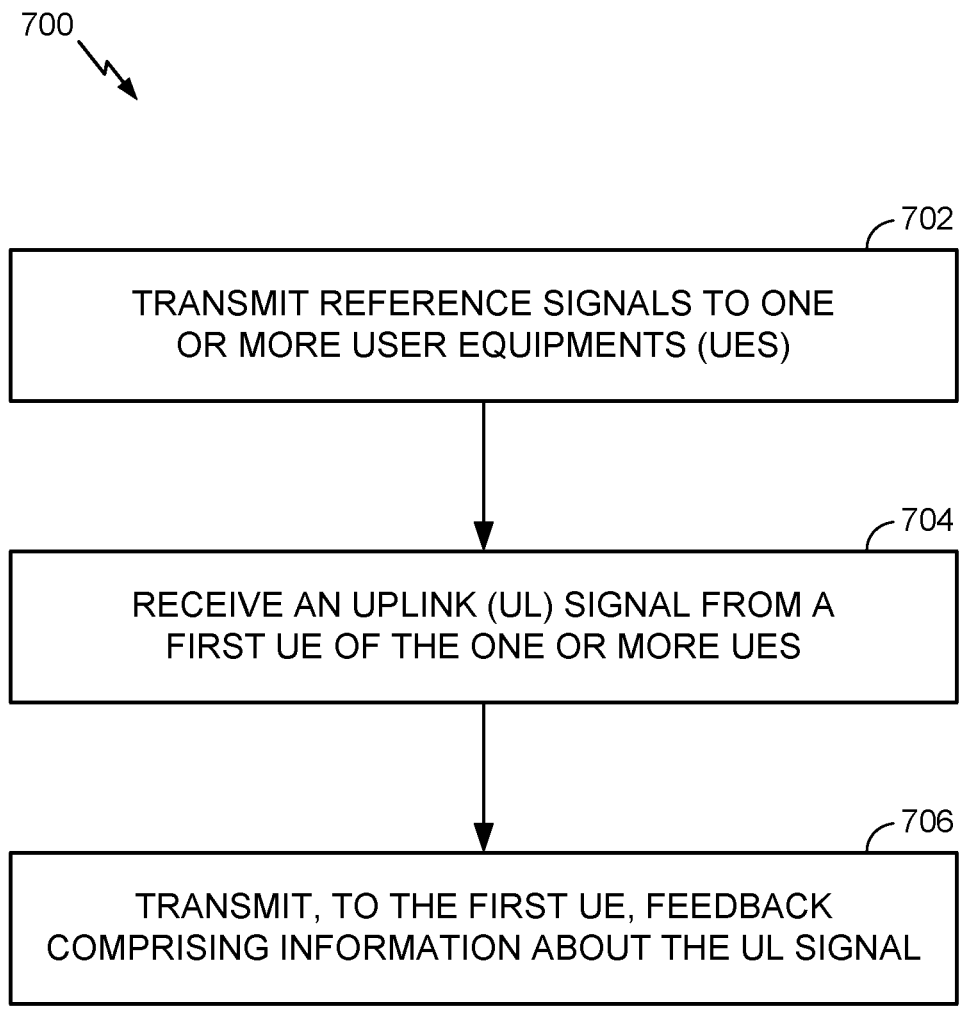
FIG. 10 is a flow diagram illustrating example operations for wireless communications by a transmission reception point (TRP), in accordance with certain aspects of the present disclosure.

FIG. 10 illustrates example operations 1000 for wireless communications. According to certain aspects, operations 1000 may be performed by a transmission and reception point (TRP) (e.g., BS 110), for example, to assist a user equipment (e.g., UE 120) in selecting a TRP from which to receive wireless service. According to certain aspects, operations 1000 may improve reliability of cell selection/reselection to ensure that the UE is capable of transmitting on the uplink. According to certain aspects, operations 1000 may be considered complementary to operations 900 performed by the UE.

According to certain aspects, the base station may include one or more components as illustrated in FIG. 4 which may be configured to perform the operations described herein. For example, the antenna 434, demodulator/modulator 432, controller/processor 440, and/or memory 442 as illustrated in FIG. 4 may perform the operations described herein Operations 1000 begin at 1002 by transmitting reference signals to one or more user equipments (UEs). At 1004, the TRP receives an uplink (UL) signal from a first UE of the one or more UEs. At 1006, the TRP transmits, to the first UE, feedback comprising information about the UL signal.

According to certain aspects, to improve reliability of cell selection/reselection and ensure that a UE is capable of transmitting on the uplink, the UE may perform TRP selection not only based on downlink measurements but also based on uplink measurements, for example, in accordance with the example operations noted above. It should be noted that TRP and cell may be used interchangeably throughout the present disclosure.

According to certain aspects, TRP selection based on uplink measurements may involve the UE sending an uplink signal to the network (e.g., a TRP) so that network can measure the uplink channel quality/signal strength of the uplink signal and send back downlink feedback information. The feedback information may comprise at least one of the measured results of the uplink signal or an indication of whether or not the uplink channel quality/signal strength of the uplink signal is strong enough to serve the UE. According to aspects, the UE may use at least one of these measured results or the indication in the feedback information to assist in selecting a TRP from which to receive wireless service. These aspects of the present disclosure will be discussed in greater detail below.

Aspects of the present disclosure may be applied to different radio resource connection (RRC) states. For example, aspects of the present disclosure may be applied to an RRC_IDLE state where UE context is not stored in RAN and the UE performs selection/reselection to determine which TRP to camp on (e.g., without receiving a handover (HO) command message from the network). Additionally, aspects of the present disclosure may be applied to an RRC COMMON state, an RRC_CONNECTED_COMMON state or an inactive state (e.g., RRC_INACTIVE state), where UE context is stored in RAN and the UE performs selection/ reselection without any HO command message (e.g., similar selection/reselection as RRC_IDLE).

According to certain aspects, a difference between the RRC_IDLE and RRC_COMMON may be how the network pages the UE when traffic arrives (core network (CN) or RAN based paging, respectively) and how the UE registers when the UE selects/reselects a new TRP. For example, in the case of RRC_IDLE, the UE may register using a non-access stratum (NAS) message based on an area ID received from the CN, whereas in the case of RRC_COMMON, the UE may register using an RRC message based on an area ID (of a different format, e.g., cell ID vs tracking area) received from the RAN).

Figure 11:
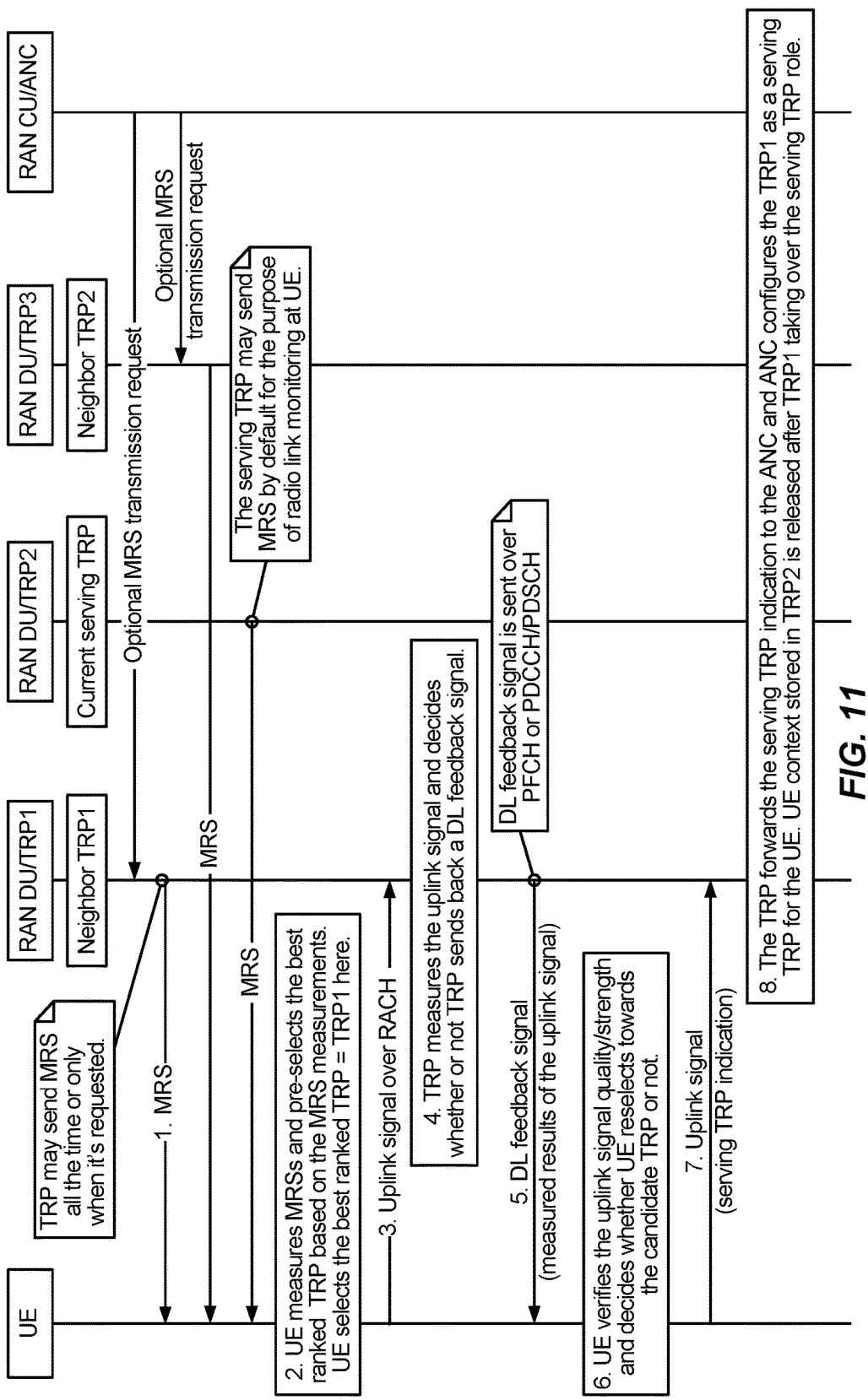
FIG. 11 is an example call flow illustrating uplink-based cell selection, in accordance with certain aspects of the present disclosure.

FIG. 11 illustrates an example call flow, illustrating a cell selection/reselection procedure (e.g., based on UL signal measurements).

As illustrated in FIG. 11, at step 1, the UE may search for and receive measurement reference signals sent from neighbor TRPs (e.g., neighbor TRP1). Additionally, the UE may perform one or more measurements on the received MRSs (e.g., to determine a corresponding reference signal received power/quality (RSRP/RSRQ) associated with that MRS), which may be used by the UE when selecting a TRP, for example, as explained below.

In some cases, while not shown in FIG. 11, the network may provide (e.g., to one or more TRPs and/or the UE) a neighbor TRP list (NTL) including a list of TRPs neighboring the UE's currently serving TRP (e.g., TRP1 and TRP2) so as to limit the number of TRPs to be searched by UE and/or limit the number of TRPs that transmit the measurement reference signal.

According to certain aspects, as illustrated at step 2 in FIG. 11, the UE may pre-select a best-ranked TRP (e.g., based on MRS measurements described above) from which to receive wireless service and may evaluate an uplink signal quality at the candidate TRP before determining to select the TRP as a serving TRP. For example, at step 3, the UE may transmit an uplink signal to the pre-selected serving TRP candidate and waits for a DL response or feedback signal. According to certain aspects, the uplink signal UL signal may comprise a random access channel (RACH) signal and/or a sounding reference signal (SRS)

According to certain aspects, at step 4, the candidate TRP that receives the uplink signal (e.g., neighbor TRP1) may measure one or more characteristics of the uplink signal (e.g., a signal quality and/or signal strength of the uplink signal) and transmit back a DL feedback signal at step 5. In some cases, the DL feedback signal may comprise at least one of the uplink signal measured results (e.g., the signal quality and/or signal strength of the uplink signal) or an indication of whether or not the uplink channel quality/ signal strength of the uplink signal is strong enough to serve the UE. In some cases, the DL feedback signal (e.g., the measured results or the indication) may be used by the UE at step 6 to determine if the UL of the candidate TRP is sufficient to serve the UE. In some cases, the DL feedback signal may be used to select among two or more pre-selected TRPs for an overall best TRP to camp on. According to certain aspects, a RAN centralized unit (CU)/access node controller (ANC) may receive measurement reports from neighboring TRPs, including information about the uplink signal transmitted by the UE measured at the neighboring TRPs via a fronthaul connection or a backhaul connection. The RAN CU/ANC may use the measurement reports received from the neighboring TRPs to determine which TRP of the neighboring TRPs may transmit the DL feedback signal back to the UE.

According to certain aspects, the DL feedback signal may also comprise at least one of an indication indicating whether or not the uplink signal is strong enough to serve the UE at the candidate TRP, an echo of the uplink signal, a pilot signal, an indication of a network load such as a number of users served by a particular TRP (e.g., the candidate TRP), an indication of a number of users of a particular service (such as industrial automation or mission critical services) served by a particular TRP (e.g., the candidate TRP), or an identifier of the UE (e.g., that may be used to identify that the feedback is intended for the UE, as described below).

According to certain aspects, in some cases, the candidate TRP may transmit the DL feedback signal at step 5 using a new PHY channel, for example a physical feedback channel (PFCH). According to certain aspects, the PFCH may be scrambled by a TRP specific identifier (TRP-ID), which may be received by the UE when the UE receives the MRS sent from the candidate TRP (e.g., the MRS may comprise the TRP-ID). Accordingly, the UE may receive the PFCH scrambled by TRP-ID, decode the PFCH using the TRP-ID, and obtain the DL feedback signal based on the decoding. According to certain aspects, during the decoding, the UE may use a UE identifier (UE-ID) included in the DL feedback signal to identify the feedback is associated with the UE.

In some cases, the network may transmit configuration information to the UE indicating at least one of timing or resources corresponding to the uplink signal to be used by the UE to receive the DL feedback signal, for example, on the PFCH. The UE may receive the configuration information and use it to receive the DL feedback signal on the PFCH, as noted.

In some cases, the UE may receive the DL feedback signal via a physical downlink control channel (PDCCH) and a physical downlink shared channel (PDSCH), which may both be scrambled by the TRP-ID. For example, the UE may monitor the PDCCH for a first message masked by a radio network temporary identifier (RNTI) (e.g., a mobility RNTI (M-RNTI), cell RNTI (C-RNTI) and/or a TRP RNTI (T-RNTI)), which comprises scheduling information indicating when and where a second message should be received on the PDSCH, which comprises the feedback information. According to certain aspects, the UE may receive the first message by decoding the PDCCH using the TRP-specific identifier (TRP-ID) and unmasking the PDCCH using the RNTI. The UE may obtain the scheduling information based on the decoding and unmasking of the PDCCH. Additionally, the UE may receive, based on the scheduling information, the second message (including the DL feedback signal) on the PDSCH by decoding the PDSCH using the TRP-specific identifier.

According to certain aspects, the network may provide the UE with one or more RNTIs (e.g., described above) used for determining a serving TRP as part of a neighbor TRP list (NTL), for example, in a broadcast message or in a unicast message.

According to certain aspects, the one or more RNTIs may comprise a single RNTI associated with a subset of TRPs in the NTL. Additionally or alternatively, the one or more RNTIs may comprise a single RNTI associated with all TRPs in the NTL. In these cases, the RNTIs may be known as mobility RNTIs (M-RNTIs).

According to aspects, if at step 6 the UE determines that the UL signal quality/strength of the candidate TRP is strong enough to serve the UE, at step 7, the UE may transmit a "serving TRP indication" to the candidate TRP, indicating that the UE is selecting the candidate TRP (e.g., neighbor TRP1) as the UE's serving TRP. The candidate TRP may then forward, at step 8, the "serving TRP indication" to the ANC, which, in turn, configures TRP1 as the serving TRP for the UE. According to aspects, the UE context stored in TRP2 may be released after TRP1 takes over as the UE's serving TRP.

Figure 12:
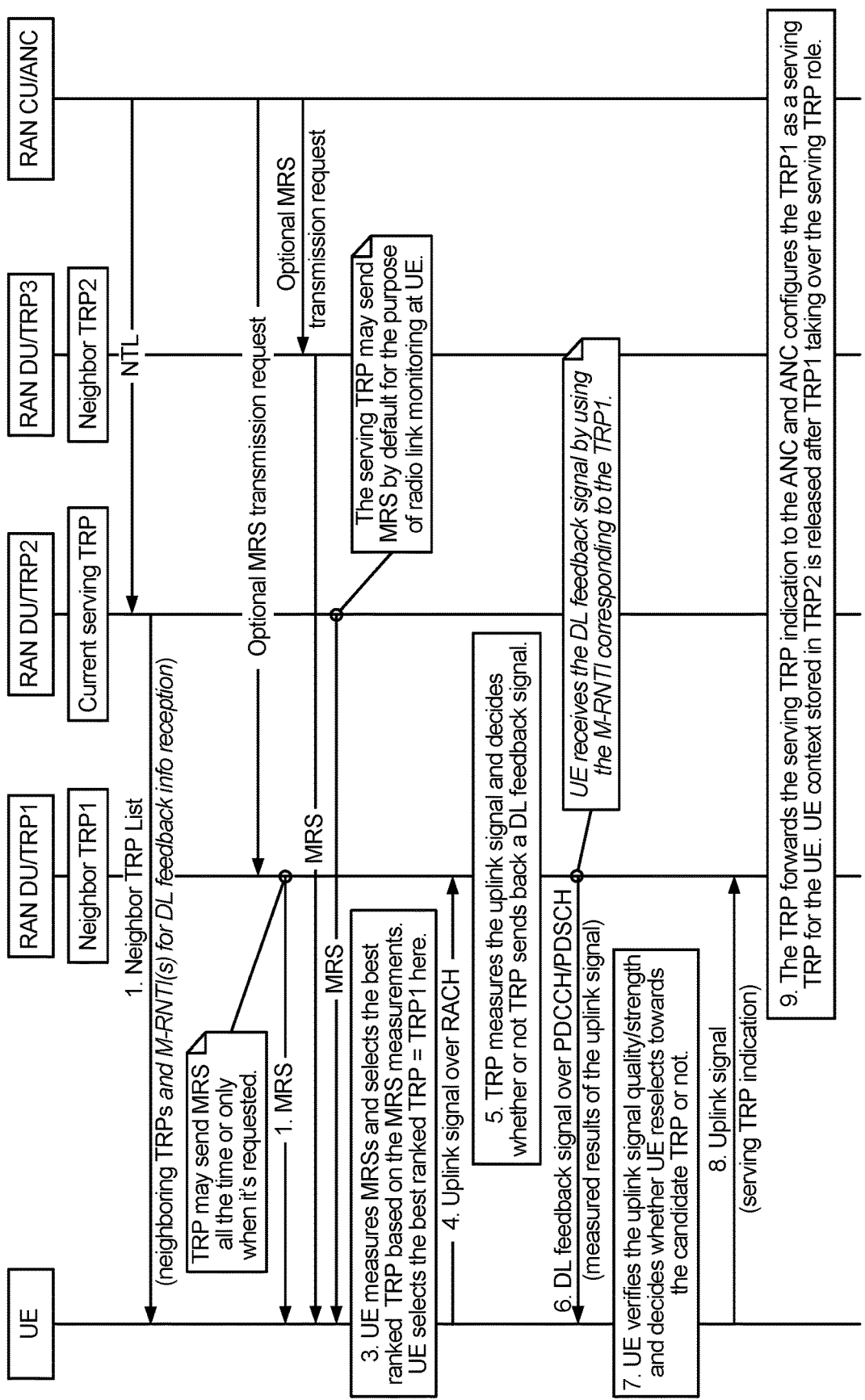
FIG. 12 is an example call flow illustrating uplink-based cell selection, in accordance with certain aspects of the present disclosure.

FIG. 12 is an example call flow illustrating, among other things, a UE receiving an M-RNTI from its serving TRP and using it to receive a DL feedback signal. For example, as illustrated at step 1 in FIG. 12, the UE may receive, from its currently serving TRP, a neighbor TRP list (NTL) comprising one or more M-RNTIs for TRPs in the NTL. Additionally, as shown in FIG. 12 at step 6, the UE may use the M-RNTI to receive the DL feedback signal. For example, at step 6, the UE may use the M-RNTI to unmask the PDCCH, as described above, to obtain scheduling information used to receive the DL feedback signal on the PDSCH. It should be noted that steps 2-5 and 7-9 of FIG. 12 are similar to steps 1-8 of FIG. 11 described above.

In some cases, the UE may attempt to access the network via the candidate TRP and may receive an RNTI assigned by the candidate TRP (e.g., known as a TRP-RNTI (T-RNTI)) from the candidate TRP, wherein the RNTI. According to certain aspects, the T-RNTI may be equivalent to a C-RNTI used in an LTE system. According to aspects, the UE may use this T-RNTI to unmask the PDCCH, as described above, to obtain scheduling information used to receive the DL feedback signal on the PDSCH.

Figure 13:
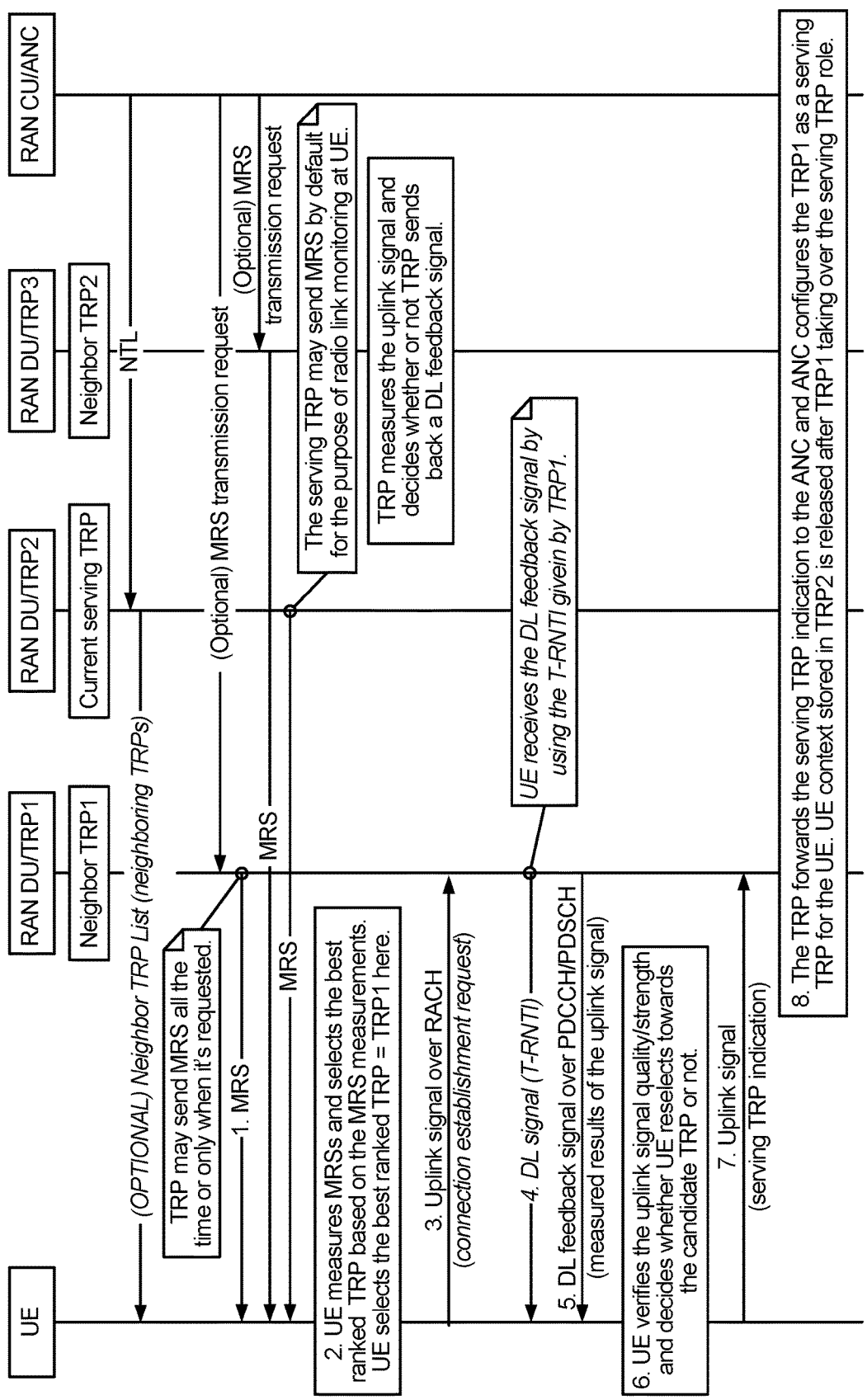
FIG. 13 is an example call flow illustrating uplink-based cell selection, in accordance with certain aspects of the present disclosure.

FIG. 13 is an example call flow illustrating, among other things, a UE receiving a T-RNTI from the candidate TRP and using it to receive a DL feedback signal. For example, as illustrated in FIG. 13, at step 4, the UE may receive a T-RNTI from the candidate TRP (e.g., TRP1 in FIG. 13) in a DL signal, for example, in response to a connection establishment request transmitted by the UE to the candidate TRP at step 3 (e.g., when the UE is attempting to access the network via the candidate TRP). Additionally, as shown in FIG. 13 at step 5, the UE may use the T-RNTI to receive the DL feedback signal. For example, the UE may use the T-RNTI to unmask the PDCCH, as described above, to obtain scheduling information used to receive the DL feedback signal on the PDSCH. It should be noted that steps 1-2 and 6-8 of FIG. 13 are similar to steps 1-8 of FIG. 11 described above.

According to certain aspects, once the UE has received the DL feedback signal, for example using the techniques described above, the UE may determine, as noted above, whether the pre-selected candidate TRP may become a serving TRP for the UE based on the DL feedback signal. That is, the UE may determine whether or not to select the candidate TRP from which to receive the wireless service based on the DL feedback (e.g., based on the uplink signal measurements and/or indication in the DL feedback signal). According to certain aspects, the UE may perform TRP reselection to a new serving TRP (e.g., by providing the "serving TRP indication" to the candidate TRP, which may be forwarded to the ANC, as described above), which fulfills criteria of uplink and downlink signal quality/strength, if the UE determines the candidate TRP is strong enough to be a serving TRP.

According to certain aspects, the UE may notify the network of the serving TRP change event with information indicating which TRP was selected as a serving TRP by the UE. In some cases, instead of notifying the network of the TRP that was selected as a serving TRP, the UE may notify the network of a registration area change event with information indicating the registration area that includes the TRP that was selected as the serving TRP. For example, the network may provide the UE with an indication of a registration area and if the TRP selected as the serving TRP is not included within the registration area, the UE may notify the network of the change in the registration area that includes the selected TRP. In some cases, according to certain aspects, each TRP may provide the UE with an indication of a registration area and if the TRP selected as the serving TRP is not identical to the one indicated by the previous serving TRP, the UE may notify the network of the change in the registration area.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting may comprise a transmitter, which may include the transmit processor 420, the TX MIMO processor 430, the modulator(s) 432*a*-432*t*, and/or antenna(s) 434*a*-434*t* of the base station 110 illustrated in FIG. 4; the transmit processor 464, the TX MIMO processor 466, the modulator(s) 454*a*-454*r*, and/or antenna(s) 452*a*-452*r* of the user equipment 120 illustrated in FIG. 4.

Means for receiving may comprise a receiver, which may include the receive processor 438, the MIMO detector 436, the demodulator(s) 432*a*-432*t*, and/or antenna(s) 434*a*-434*t* of the base station 110 illustrated in FIG. 4; the receive processor 458, the MIMO detector 456, the demodulator(s) 454*a*-454*r*, and/or antenna(s) 452*a*-452*r* of the user equipment 120 illustrated in FIG. 4.

Means for determining, means for pre-selecting, means for monitoring, means for notifying, means for decoding, and/or means for measuring may comprise a processing system, which may include controller/processor 440 and/or the other processors of the base station 110 illustrated in FIG. 4; the controller/processor 480 and/or other processors of the user equipment 120 illustrates in FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
    receiving reference signals from one or more transmission reception points (TRPs) in a wireless communications network;
    pre-selecting, based on the received reference signals, a first TRP, of the one or more TRPs, from which to receive wireless service;
    transmitting an uplink (UL) signal to the first TRP;
    receiving, from the first TRP, feedback comprising information about the UL signal; and
    determining, based at least in part on the feedback, to select the first TRP from which to receive the wireless service,
    wherein, at least one of:
        the UE performs the method, without a handover command message, to determine a new TRP to camp on in an operating state in which a context of the UE is not stored in the wireless communications network; or
        the UE performs the method, without a handover command message, to determine a new TRP to camp on if the context of the UE is stored in the wireless communications network.

2. The method of claim 1, wherein the reference signals comprise measurement reference signals (MRSs).

3. The method of claim 1, further comprising receiving an indication of an registration area, wherein the registration area includes one or more the TRPs.

4. The method of claim 3, further comprising:
    determining if the selected first TRP belongs to the registration area; and
    if the selected first TRP belongs to a different registration area, notifying the wireless communications network to a change in the registration area based on different registration area.

5. The method of claim 1, further comprising receiving an indication of a neighbor TRP list (NTL), wherein the NTL comprises one of more TRPs neighboring a serving TRP of the UE, and wherein receiving reference signals from one or more TRPs in the wireless communication network comprises receiving reference signals only from the TRPs neighboring the serving TRP.

6. The method of claim 1, wherein the UL signal comprises at least one of a random access channel (RACH) signal or a sounding reference signal (SRS).

7. The method of claim 1, wherein the feedback comprises information about one or more measured characteristics of the UL signal.

8. The method of claim 7, wherein the one or more measured characteristics comprise at least one of a signal quality of the UL signal at the first TRP or a signal strength of the UL signal at the first TRP.

9. The method of claim 1, wherein the feedback further comprises at least one of an indication of whether the UL signal is strong enough to serve the UE at the first TRP, an indication of loading at the first TRP, a number of users served by the first TRP, a number of users using a particular service at the first TRP, an echo of the UL signal, a pilot signal, or an identifier of the UE (UE-ID).

10. The method of claim 1, further comprising notifying the wireless communications network of at least one of:
   a serving TRP change indicating that the first TRP was selected by the UE as a serving TRP; or
   a registration area change.

11. The method of claim 1, wherein receiving the feedback comprises receiving the feedback via a physical downlink control channel (PDCCH) and a physical downlink shared channel (PDSCH).

12. The method of claim 11, wherein the PDCCH and the PDSCH are scrambled with a TRP-specific identity for the first TRP and a first message on the PDCCH is masked with a radio network temporary identifier (RNTI).

13. The method of claim 12, further comprising receiving, from the wireless communications network, one or more RNTIs, used for determining a serving TRP as part of a neighbor TRP list (NTL), in a broadcast message or in a unicast message.

14. The method of claim 13, wherein:
   the one or more RNTIs comprise a single RNTI associated with a subset of TRPs in the NTL; or
   the one or more RNTIs comprise a single RNTI associated with all TRPs in the NTL.

15. The method of claim 12, further comprising receiving, while the UE is attempting to access the wireless communication network via the first TRP, the RNTI from the first TRP, wherein the RNTI is assigned by the first TRP.

16. The method of claim 12, further comprising:
   monitoring the PDCCH for the first message, wherein the first message comprises scheduling information indicating when a second message should be received on the PDSCH, wherein the second message comprises the feedback;
   receiving the first message by decoding the PDCCH using the TRP-specific identifier and unmasking the PDCCH using the RNTI;
   obtaining the scheduling information based on the decoding and unmasking of the PDCCH;
   receiving, based on the scheduling information, the second message on the PDSCH by decoding the PDSCH using the TRP-specific identifier; and
   obtaining the feedback based on the decoding of the PDSCH.

17. The method of claim 1, wherein pre-selecting comprises:
   measuring the reference signals from the one or more TRPs to determine a rank of each reference signal; and
   pre-selecting the first TRP based on the rank of the reference signal received from the first TRP.

18. The method of claim 1, further comprising receiving, from each of the one or more TRPs, an indication of a registration area, wherein the registration area comprises the one or more TRPs; and
   if the indication of the registration area received from the selected first TRP is different from the indication of the registration area of a serving TRP of the UE, notifying the wireless communications network to a change in the registration area.

19. An apparatus for wireless communication by a user equipment (UE), comprising:
   means for receiving reference signals from one or more transmission reception points (TRPs) in a wireless communications network;
   means for pre-selecting, based on the received reference signals, a first TRP, of the one or more TRPs, from which to receive wireless service;
   means for transmitting an uplink (UL) signal to the first TRP;
   means for receiving, from the first TRP, feedback comprising information about the UL signal; and
   means for determining, based at least in part on the feedback, without a handover command message, at least one of:
      a new TRP to camp on in an operating state in which a context of the UE is not stored in the wireless communications network; or
      a new TRP to camp on if the context of the UE is stored in the wireless communications network.

20. A method for wireless communication by a user equipment (UE), comprising:
   receiving reference signals from one or more transmission reception points (TRPs) in a wireless communications network;
   pre-selecting, based on the received reference signals, a first TRP, of the one or more TRPs, from which to receive wireless service;
   transmitting an uplink (UL) signal to the first TRP;
   receiving, from the first TRP, feedback comprising information about the UL signal; and
   determining, based at least in part on the feedback, to select the first TRP from which to receive the wireless service,
   wherein receiving the feedback comprises receiving the feedback on a channel specifically designated for transmission and reception of feedback for UL signals;
   wherein the channel is scrambled with a TRP-specific identifier;
   wherein the reference signal received from the first TRP comprises the TRP-specific identifier for the first TRP; and
   further comprising decoding the channel using the TRP-specific identifier for the first TRP to receive the feedback.

21. The method of claim 20, wherein decoding the channel using the TRP-specific identifier for the first TRP to receive the feedback comprises using a UE identifier (UE-ID) included in the feedback to identify the feedback is associated with the UE.

22. The method of claim 20, further comprising receiving, from the wireless communications network, a configuration indicating at least one of timing or resources, corresponding to the UL signal, to be used to receive the feedback, and wherein the decoding of the channel is based, at least in part, on the configuration.

23. An apparatus for wireless communication by a user equipment (UE), comprising:
   at least one processor configured to:
      receive reference signals from one or more transmission reception points (TRPs) in a wireless communications network, the reference signals including TRP-specific identifiers for the one or more TRPs;
      pre-select, based on the received reference signals, a first TRP, of the one or more TRPs, from which to receive wireless service;
      transmit an uplink (UL) signal to the first TRP;
      receive, from the first TRP, on a channel specifically designated for transmission and reception of feedback for UL signals, feedback comprising information about the UL signal;

decode the channel using the TRP-specific identifier for the first TRP; and determine, based at least in part on the feedback, to select the first TRP from which to receive the wireless service; and a memory coupled with the at least one processor.

24. A non-transitory computer-readable medium for wireless communication by a user equipment (UE), comprising instructions that, when executed by at least one processor, cause the at least one processor to:

receive reference signals from one or more transmission reception points (TRPs) in a wireless communications network, wherein each reference signals includes a TRP-specific identifier;

pre-select, based on the received reference signals, a first TRP, of the one or more TRPs, from which to receive wireless service;

transmit an uplink (UL) signal to the first TRP;

receive, from the first TRP, on a channel specifically designated for transmission and reception of feedback for UL signals, feedback comprising information about the UL signal;

means to descramble the channel using a TRP-specific identifier of the first TRP to access the feedback; and determine, based at least in part on the feedback, to select the first TRP from which to receive the wireless service.

* * * * *